(12) United States Patent
Seethaler

(10) Patent No.: US 11,173,762 B2
(45) Date of Patent: Nov. 16, 2021

(54) WHEEL SUSPENSION FOR A MOTOR VEHICLE

(71) Applicant: Bayerische Motoren Werke Aktiengesellschaft, Munich (DE)

(72) Inventor: Ludwig Seethaler, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/050,228

(22) PCT Filed: Apr. 9, 2019

(86) PCT No.: PCT/EP2019/058960
§ 371 (c)(1),
(2) Date: Oct. 23, 2020

(87) PCT Pub. No.: WO2019/206622
PCT Pub. Date: Oct. 31, 2019

(65) Prior Publication Data
US 2021/0229513 A1 Jul. 29, 2021

(30) Foreign Application Priority Data

Apr. 25, 2018 (DE) ...................... 10 2018 206 417.2

(51) Int. Cl.
*B60G 7/00* (2006.01)
*B60G 7/02* (2006.01)
*B60G 3/20* (2006.01)

(52) U.S. Cl.
CPC .............. *B60G 7/001* (2013.01); *B60G 7/02* (2013.01); *B60G 3/20* (2013.01);
(Continued)

(58) Field of Classification Search
CPC . B60G 7/001; B60G 7/02; B60G 3/20; B60G 2204/143; B60G 2206/122; B60G 2206/124; B60G 2204/1431
See application file for complete search history.

(56) References Cited

U.S. PATENT DOCUMENTS 2,611,625 A 9/1952 Kishline et al.
2,797,930 A 7/1957 Booth
(Continued)

FOREIGN PATENT DOCUMENTS

DE 10 2006 053 030 A1 5/2008
DE 10 2016 211 291 A1 12/2017
(Continued)

OTHER PUBLICATIONS

International Search Report (PCT/ISA/210) issued in PCT Application No. PCT/EP2019/058960 dated Jul. 24, 2019 with English translation (six (6) pages).
(Continued)

*Primary Examiner* — Darlene P Condra
(74) *Attorney, Agent, or Firm* — Crowell & Moring LLP

(57) ABSTRACT

A method controls a user interface and an air-conditioning unit of a vehicle. The user interface includes display and operating elements. The method displays a plurality of the elements on the user interface, receives at least two operation parameters of the air-conditioning unit, determines one or more display parameters for a first element from the plurality of elements on the basis of the at least two operation parameters, and displays the first element on the basis of the one or more display parameters.

13 Claims, 3 Drawing Sheets

(52) U.S. Cl.
CPC .. *B60G 2204/143* (2013.01); *B60G 2206/122* (2013.01); *B60G 2206/124* (2013.01)

(56) References Cited

U.S. PATENT DOCUMENTS

| | | | |
|---|---|---|---|
| 5,516,130 A | | 5/1996 | Mitchell |
| 5,845,938 A | * | 12/1998 | Kato .................... B60G 7/001 |
| | | | 280/784 |
| 6,070,445 A | * | 6/2000 | Holierhoek ........... B21D 53/88 |
| | | | 29/421.1 |
| 8,925,301 B2 | * | 1/2015 | Hashimoto ............ F01N 9/00 |
| | | | 60/277 |
| 9,731,573 B2 | * | 8/2017 | Suzuki .................... B60G 7/02 |
| 9,884,531 B2 | * | 2/2018 | Watanabe ............. B60G 7/001 |
| 10,457,105 B2 | * | 10/2019 | Watanabe ............. B60G 7/001 |
| 10,814,535 B2 | * | 10/2020 | Lee ....................... B60G 7/005 |
| 2002/0005621 A1 | | 1/2002 | Christophliemke et al. |
| 2009/0066049 A1 | | 3/2009 | Kunert et al. |
| 2011/0272911 A1 | | 11/2011 | Gerhards et al. |
| 2014/0210177 A1 | * | 7/2014 | Dicke .................... B60G 7/001 |
| | | | 280/124.134 |
| 2020/0223271 A1 | * | 7/2020 | Darin .................... B62D 27/026 |

FOREIGN PATENT DOCUMENTS

| | | |
|---|---|---|
| EP | 0 913 277 A1 | 5/1999 |
| FR | 2 777 224 A1 | 10/1999 |
| GB | 2529870 A | 3/2016 |
| WO | WO 2010/066226 A1 | 6/2010 |
| WO | WO 2017/220589 A1 | 12/2017 |

OTHER PUBLICATIONS

German-language Written Opinion (PCT/ISA/237) issued in PCT Application No. PCT/EP2019/058960 dated Jul. 24, 2019 (six (6) pages).

German-language Search Report issued in German Application No. 10 2018 206 417.2 dated Mar. 21, 2019 with partial English translation (12 pages).

* cited by examiner

WHEEL SUSPENSION FOR A MOTOR VEHICLE

BACKGROUND AND SUMMARY OF THE INVENTION

The embodiments of the invention relate to a wheel suspension for a motor vehicle.

Three-point control arms are used as a connection between the vehicle body and the wheel carrier, in particular in the case of double wishbone front axles or else in the case of suspension strut front axles. The control arm is customarily sickle-shaped or boomerang-shaped because of the wheel steering angle. The three-point control arm is mounted here at in each case two points on the bodywork or on the vehicle body by means of a respective bearing (a front and a rear bearing in the direction of travel of the vehicle), customarily by a rubber bearing, and on the wheel carrier by a bearing, customarily by a ball joint. The arrangement of the two bodywork-side bearings means that the control arm is loaded by longitudinal and transverse forces both in the longitudinal direction and in the transverse direction.

However, the arrangement mentioned of the bearings in a three-point control arm has to enter into a compromise in the reconciliation between acoustics and comfort, on the one hand, and driving dynamics, on the other hand. Owing to the fact that the vehicle-body-side mounting of the three-point control arm has to absorb both transverse forces and longitudinal forces and that the mounting should ideally be configured to be as soft as possible in the longitudinal direction of the vehicle in order to increase the comfort and to be as hard as possible in the transverse direction of the vehicle for driving dynamic reasons, a conflict of objectives arises between acoustics/comfort and driving dynamics.

The rear bearing is generally designed as a relatively soft rubber bearing and, in the event of external longitudinal forces, provides a certain deformation path in order to ensure sufficient longitudinal suspension. If the axial direction of the rubber bearing is arranged approximately in the longitudinal direction of the vehicle, it is possible to select the axial spring rate of the bearing to be very low. The bearing thus absorbs virtually no longitudinal forces and is loaded purely radially. However, the result of this is that all of the external longitudinal forces have to be supported on the front transverse control arm bearing. If said front bearing is likewise designed as a rubber bearing, the axis of rotation (corresponds to the screw connection axis) has to be arranged approximately in the direction of travel in order to avoid excessively high cardanic angles. The longitudinal forces therefore act as axial loads on the rubber bearing and necessitate either very hard spring rates or axial stops or both.

The described loadings on the front transverse control arm bearing make it difficult to achieve a high degree of ride comfort and good acoustic decoupling.

It can therefore be expedient, by means of the compound assembly of the three-point control arm, to provide a separation of the two functions of transverse rigidity and longitudinal elasticity. If the lower three-point control arm is replaced, for example, by two two-point control arms, one arranged transversely and another obliquely, the two functions (transverse rigidity and longitudinal elasticity) are separated from each other in this geometrical configuration by pure tensile or compressive force transmission.

A solution customarily used in practice for the compound assembly mentioned of the three-point control arm is shown in GB 2529870 A. A compound three-point control arm is shown here, in which the diagonal control arm is not mounted on the wheel carrier, but rather on the transverse control arm by means of a rubber bearing. The transverse control arm is thereby loaded only to a greater extent in the transverse direction of the vehicle and the diagonal control arm only to a greater extent in the direction arising from the virtual connecting line between the wheel-carrier-side mounting of the transverse control arm and the body-side mounting of the diagonal control arm. The kinematic points remain unchanged here. The compromise in the reconciliation between acoustics and driving dynamics can thus be solved by a compound assembly of the three-point control arm.

However, this embodiment is disadvantageous in that the bearing point of the diagonal control arm on the transverse control arm can be difficult to realize for reasons of construction space or package in some vehicle variants. For example, the rim may require this construction space at an acute wheel steering angle. In addition, such a compound assembly of a three-point control arm is associated with a comparatively large outlay, requires an additional rubber bearing and thus causes additional costs, complexity and weight.

It is therefore an object of the embodiments of the invention to solve the described conflict of objectives between operating strength, on the one hand, and comfort and acoustics of an installed three-point control arm, on the other hand, and at the same time to ensure a low outlay on manufacturing and costs of the three-point control arm.

This and other objects are achieved by means of the inventive wheel suspension disclosed in this application. Advantageous developments and refinements thereof are also disclosed in this application.

A wheel suspension, in particular a front axle wheel suspension, for a motor vehicle is proposed. The wheel suspension comprises, in particular in what is referred to as a lower control arm plane, a wheel-guiding three-point control arm connecting the wheel carrier to the vehicle body.

The lower control arm plane describes a (virtually horizontal) plane which is spanned by the wheel-guiding three-point control arm and is provided below the axis of rotation of the wheel, as viewed on the vertical axis of the vehicle.

The three-point control arm is designed here to be at least approximately sickle-shaped or boomerang-shaped, wherein it can be divided into two different regions which can preferably be identified as two regions which can be distinguished from each other. The three-point control arm is nevertheless designed as an integral component.

The three-point control arm is formed here by a transverse control arm region and a tension and/or compression strut region (also referred to below only as compression strut region).

When the control arm is installed, the transverse control arm region is formed by the region of the three-point control arm that runs at least approximately in the transverse direction of the vehicle. The transverse control arm region extends here from the attachment of the control arm to the wheel carrier as far as a front bearing of the control arm on the vehicle body. The front bearing here is preferably a rubber bearing, the axis of rotation or longitudinal axis of which in the installed state in the vehicle is aligned at least approximately in the longitudinal direction of the vehicle.

The compression strut region is formed by the remaining region of the three-point control arm and is therefore formed by the region of the three-point control arm that runs obliquely with respect to the longitudinal direction of the vehicle. The compression strut region is connected to the vehicle body by a rear bearing (as viewed in the direction of travel of the vehicle). The rear bearing is also preferably a rubber bearing, in which the bearing longitudinal axis is aligned at least approximately perpendicularly to the connecting line of the rear bearing with the wheel-carrier-side joint of the three-point control arm, the line of action of the force. In the installed state, the rear bearing is located behind the front bearing, as viewed in the direction of travel of the vehicle (when the vehicle is travelling forward).

The rear bearing, in particular rubber bearing, is preferably designed here to be comparatively soft in the radial direction, with a large deformation path arising in the event of longitudinal forces. This means that the rear bearing preferably scarcely absorbs axial forces and is only loaded radially (if the axis of rotation of the bearing is aligned at least approximately perpendicularly to the line of action of the force, as described above).

The two regions of the control arm (transverse control arm region and compression strut region) are preferably partially detached from each other by a notch. Alternatively, or omitting a notch, the two regions may also be at least partially detached from each other by a gap. Such a notch or gap then reinforces, for example, the differentiation between the transverse control arm region and the compression strut region. It is thus preferably provided that, in a top view of the installed control arm, the connection between the transverse control arm and the compression strut region is compound in the form of a notch or a gap. This notch or the gap particularly preferably extends, as viewed in the transverse direction of the vehicle, from the vehicle body to approx. half the length of the transverse control arm region in the direction of the wheel carrier. The lower such a notch or gap is or the further such a notch or gap extends in the direction of the wheel carrier, the higher are the deformations and therefore the taking on of a joint function by the notch or the gap under longitudinal forces.

However, it should also be noted here that the stresses in the notch base are increased as the length of the notch or of the gap increases. It is thus advantageous to design the length of the notch or the gap in such a manner that an optimum compromise is found between deformation and stresses.

In order to reduce the axial load on the front bearing (also called transverse control arm bearing) and to achieve a greater freedom of design for said bearing, it is provided that at least one portion of the three-point control arm has a cross-sectional tapering running in the longitudinal direction of the vehicle when the control arm is installed. Such a cross-sectional tapering is comparable to a film hinge which is integrated in the component itself and which specifically has a low flexural rigidity about the vertical axis of the vehicle and therefore constitutes the joint function in the (preferably metal) material of the control arm.

The cross-sectional tapering is provided here exclusively (as viewed in the installed state of the control arm) in the width thereof, i.e. virtually in the longitudinal direction of the vehicle. This means that the "film hinge" resulting from the cross-sectional tapering is formed on the control arm in such a manner that the flexibility of the film hinge permits rotation about the vertical axis of the vehicle. This is because axial forces on the transverse control arm bearing arise only if the external forces are longitudinal forces and the resulting torques on the bearing rotate about the vertical axis of the vehicle. The film hinge resulting from the cross-sectional tapering is therefore flexible about the vertical axis of the vehicle.

It is preferably provided here that the wall thickness of the portion with the cross-sectional tapering is at most half the size of the wall thickness of the remaining cross section of the three-point control arm. A reduction in the control arm cross section (in the longitudinal direction of the vehicle or in the "width" of the cross section) by the factor of 2 to 3 in relation to the initial cross section of the control arm is particularly preferably provided.

It is furthermore preferably provided here that the height of the cross section of the control arm at the location of the cross-sectional tapering, i.e. the cross section as viewed in the direction of the vertical axis of the vehicle, does not undergo any tapering. This is advantageous since tensile and compressive forces which arise can thus continue to be transmitted.

It is furthermore preferably provided that the cross section of the transverse control arm region and of the compression strut region in the installed state is also at least predominately the same size, as viewed in the vertical direction of the vehicle. Recesses or separated height differences (running in the cross section in the vertical direction of the vehicle), as are known in conventional designs of control arms, are also included here, wherein an at least approximately identical height of the cross section means a cross section formed with a uniform height, as viewed in its entirety.

The preferred notch or the gap and the cross-sectional tapering result in an optimum joint function such that the axial loads on the front bearing can be optimally reduced and at the same time the ride comfort can be improved and acoustic decoupling can take place by means of a softer transverse control arm bearing. Additional outlay on construction, construction space, complexity and costs can advantageously be saved by forming the control arm integrally (i.e. not using a rubber bearing as shown in the prior art).

Here, preferably, only a (length-limited) portion of the three-point control arm is provided with such a "film hinge" or such a cross-sectional tapering.

A plurality of alternatives are available for the precise arrangement region of such a film hinge or such a cross-sectional tapering.

In a preferred embodiment of the invention, the cross-sectional tapering is arranged on a portion of the transverse control arm region. This portion with the cross-sectional tapering is particularly preferably arranged, as viewed in the transverse direction of the vehicle, closer to the vehicle body than to the wheel carrier. The portion is preferably located here in the direct vicinity of the front bearing, i.e. of the transverse control arm bearing.

It is furthermore preferably provided that the cross section at such a portion is tapered to a minimum of approx. 6 mm.

Alternatively or else in addition, a cross-sectional tapering at other portions on the transverse control arm region or else on the compression strut region is conceivable.

The entire transverse control arm region or the entire compression strut region can also be tapered in its cross section here. Examples of exemplary embodiments can be gathered from the figures.

It is furthermore preferred that the control arm is formed from an aluminum material. For example, the control arm can be produced here from an aluminum wrought alloy.

The control arm is particularly preferably produced here in a casting or forging process. It is advantageous here that the control arm together with the two regions is already formed as an integral component in the production process.

Alternatively, it is also possible to manufacture the transverse control arm region and the compression strut region as individual parts and to weld, screw or to rivet them to one another in a second production step. In particular the region between the notch base of the preferred notch or of the gap and the connection of the wheel-carrier-side joint is conceivable here as the joining point. In such a design (i.e. compression strut region and transverse control arm region as individual parts which are subsequently joined), the two regions may also be designed as extruded profiles.

These and further features apart from being clear from the claims and the description are also clear from the drawings, wherein the individual features are in each case realized individually or in a plurality in the form of sub-combinations in an embodiment of the invention and can represent advantageous embodiments which are independently patentable and for which protection is claimed here.

The embodiments of the invention will be explained in more detail below with reference to six exemplary embodiments.

DETAILED DESCRIPTION OF THE DRAWINGS

Figure 1:
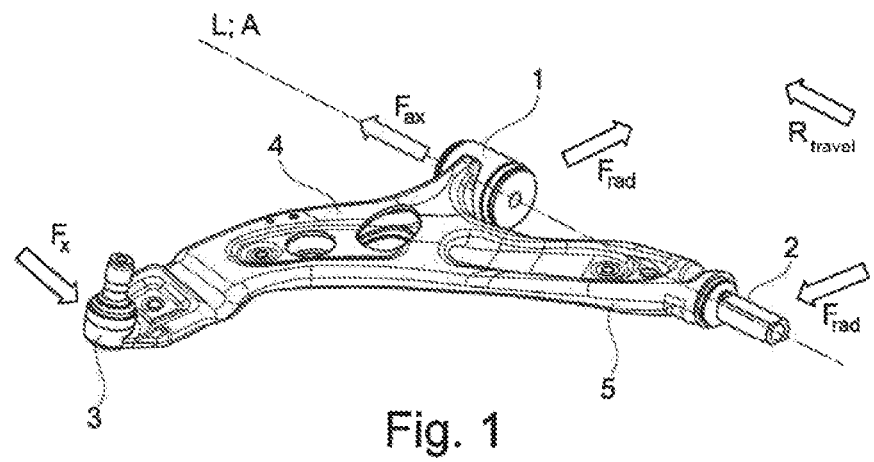
FIG. 1 shows an embodiment known in the prior art of a three-point control arm in a three-dimensional view.

The disadvantages of the prior art will be explained with reference to the three-point control arm known from the prior art according to FIG. 1. A three-point control arm of a motor vehicle is shown here in a three-dimensional view, said three-point control arm being connected to a wheel carrier (not shown) by means of a wheel-side joint 3 and to a vehicle body (not shown) by means of a front rubber bearing 1 and a rear bearing 2 (not shown).

In the installed state of the control arm, the front bearing 1 is located here in front of the rear bearing 2, as viewed in the direction of travel $R_{travel}$ of the vehicle. The rear bearing 2 can also be designed, for example, as a rubber bearing. The three-point control arm comprises here a transverse control arm region 4 and a compression strut region 5.

In the installed state of the control arm, the transverse control region 4 is formed by the region of the three-point control arm that runs at least approximately in the transverse direction Q of the vehicle. The transverse control arm region 4 extends here from the connection of the control arm on the wheel carrier 3 as far as the front bearing 1 of the control arm on a vehicle body (not shown). The front bearing 1 here is preferably a rubber bearing, the axis of rotation or longitudinal axis A of which in the installed state in the vehicle is aligned at least approximately in the longitudinal direction L of the vehicle.

The compression strut region 5 is formed by the remaining region of the three-point control arm and is thus formed by the region of the three-point control arm that runs at least approximately in the longitudinal direction L of the vehicle. The compression strut region 5 is connected to the vehicle body (not shown) by means of the rear bearing 2 (as viewed in the direction of travel $R_{travel}$ of the vehicle). The rear bearing 2 is preferably also a rubber bearing in which the bearing longitudinal axis A is aligned at least approximately in the longitudinal direction L of the vehicle.

Said rear bearing 2 is generally designed as a relatively soft rubber bearing and, in the event of external longitudinal forces $F_x$ on the wheel, provides a certain deformation path in order to ensure sufficient longitudinal suspension. If the axial direction of the rubber bearing is arranged approximately in the direction of travel $R_{travel}$, it is possible to select the axial spring rate of the bearing to be very low. The bearing thus absorbs virtually no longitudinal forces $F_{ax}$ and the bearing is loaded purely radially $F_{rad}$.

However, it follows from this that all of the external longitudinal forces $F_{ax}$ have to be supported on the front bearing 1. The axis of rotation of the front bearing 1 has to be arranged approximately in the direction of travel $R_{travel}$ in order to avoid excessively high cardanic angles. The longitudinal forces therefore act as axial loads $F_{ax}$ on the rubber bearing 1 and necessitate either very hard spring rates, axial stops or both.

The described loadings on the front bearing 1 make it difficult to achieve a high degree of ride comfort and good acoustic decoupling. For this purpose, as soft a rubber mixture as possible would be required, but, with the axial loads $F_{ax}$ occurring, this would lead to operating strength problems. A durable design of the rubber bearing 1 requires small axial deformation paths which can be achieved only with high rigidities or axial stops. Neither are favorable for comfort and acoustics.

Figure 2:
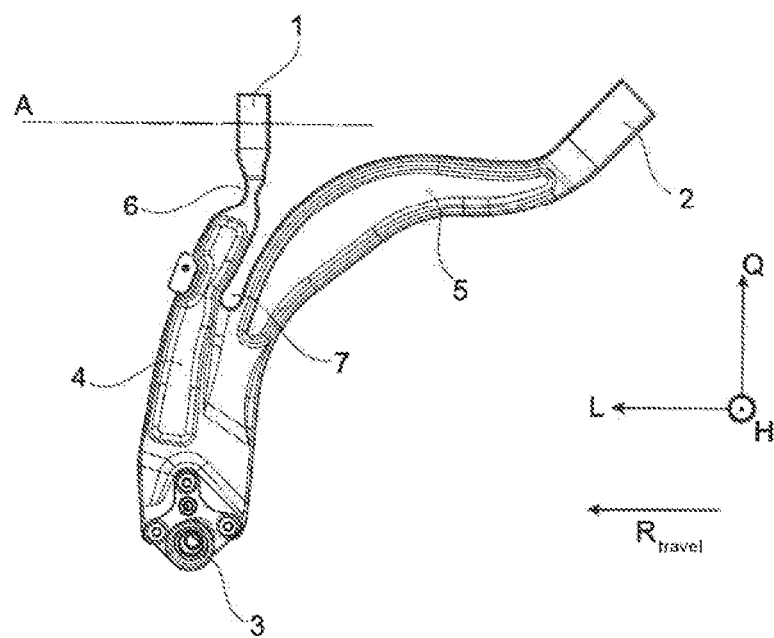
FIG. 2 shows an exemplary three-point control arm according to the invention of a front axle wheel suspension in a top view, in a position as though it were installed in a vehicle.

FIG. 2 shows an embodiment of a three-point control arm according to the invention in a top view. The components of the control arm do not substantially differ here from the prior art example from FIG. 1 (except for the inventive features mentioned below). The control arm from FIG. 2 therefore likewise comprises the front bearing 1, the rear bearing 2 and the attachment 3 to the wheel carrier (not shown), and also a transverse control arm region 4 and a compression strut region 5.

In order to relieve the front bearing 1 from the axial loads and to achieve a greater design freedom of said bearing 1 with regard to the rigidities, the cross section of the transverse control arm region 4 is tapered at a portion in the direction of the longitudinal axis L of the vehicle at least in the direct vicinity of the front bearing 1. Such a cross-sectional tapering 6 of the material is similar to a design of a film hinge that specifically has a low flexural strength about the vertical axis H and therefore represents a joint function in the metal basic material. Axial forces on the front bearing 1 arise only if the external forces are longitudinal forces and the resulting torques on the front bearing 1 rotate about the vertical axis H of the vehicle; the film hinge 6 therefore needs to be flexible about the vertical axis H.

Furthermore, a notch 7 or a gap 7 is provided between the transverse control arm region 4 and the compression strut region 5 in the case of the control arm from FIG. 2. The notch 7 or the gap 7 at least partially separates the two regions 4, 5 spatially from each other. The notch 7 or the gap 7 in this example projects from the front bearing 1 of the transverse control arm region 4 in the direction of the attachment 3 on the wheel carrier (not shown) up to approx. half the length of the transverse control arm region 4. The joint function mentioned of the control arm is thus composed of the two components of "specific tapering 6 of the cross section at the front bearing eye 1" and "design of the notch 7 between the transverse control arm region and the compression strut region". The lower the notch 7 or the gap 7 projects from the front bearing 1 or from the vehicle body (not shown) in the direction of the attachment 3 or in the direction of the wheel carrier (not shown), the higher the stresses will also become in the notch space. An optimum compromise between the stresses mentioned and a sufficient joint function thus has to be found, for which reason the half-length mentioned of the transverse control arm region 4 is particularly preferably suitable for a notch length.

The cross-sectional tapering 6 mentioned and additionally preferably together with a notch 7 or gap 7 mentioned makes it possible to produce a joint function in the control arm itself, the joint function comprising an optimum control arm configuration with respect to complexity, costs, strength and also ride comfort and acoustic decoupling. The operating strength of a rubber bearing as the front bearing 1 can advantageously be ensured by reducing the axial loads while at the same time an additional structural outlay can be saved (by avoiding a compound transverse control arm and therefore avoiding an additional rubber bearing). Furthermore, a virtually cost- and outlay-neutral embodiment of a metal joint function of the control arm is possible.

As an alternative to the cross-sectional tapering 6 in the transverse control arm region 4 on the front bearing 1, FIGS. 3, 4, 5 and 6 show further possible exemplary embodiments. It is shown here by way of example on which other portions or regions of the control arm the cross-sectional tapering 6 may be arranged. Different notch depths 7 in different variants can also be seen.

These are, in each case, examples in which the respective notch depths 7 and notch design can also be combined with the cross-sectional taperings 6 of the respective exemplary embodiments.

The respective reference signs are identical to the previous FIGS. 1 and 2 for the same control arm components.

Figure 3:
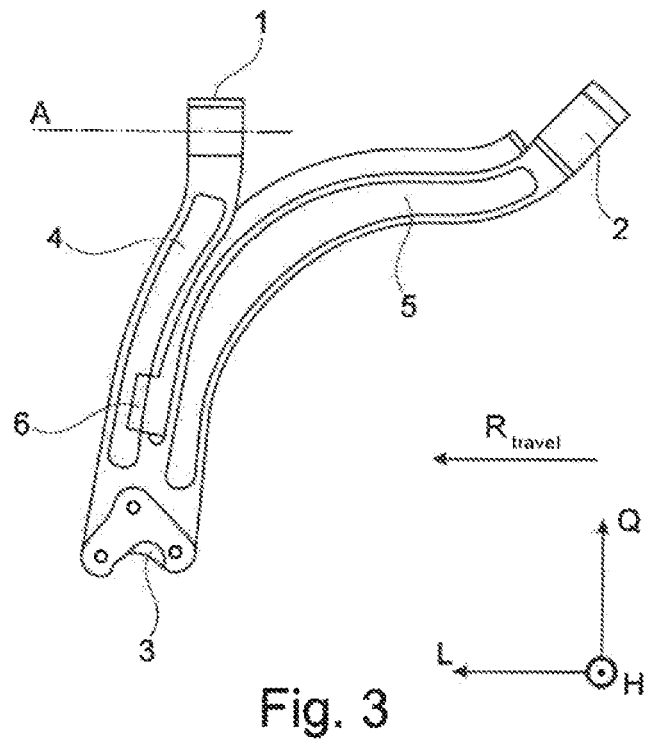
FIGS. 3 to 6 show further exemplary embodiments of a three-point control arm according to the invention, also in a top view of the control arm, in a position as though the control arm were installed in a vehicle.

For example, the exemplary embodiment from FIG. 3 shows a control arm in which no notch 7 or gap 7 can be seen. The cross-sectional tapering 6 is arranged here on a portion on the transverse control arm region 4, which portion is arranged in the vicinity of the wheel-side bearing 3.

Figure 4:
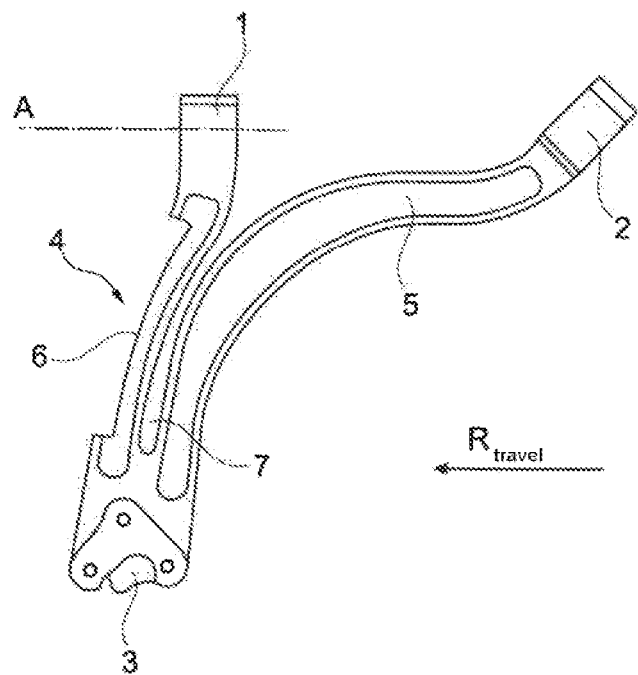

The control arm according to FIG. 4 here comprises a cross-sectional tapering 6 which extends along the entire length of the transverse control arm region 4. In addition, the control arm from FIG. 4 has a notch 7 or a gap 7 which, in contrast to the notch 7 or the gap 7 from FIG. 2, projects more deeply in the direction of the wheel-side bearing 3. Such a large notch depth 7 (from the front bearing 1 in the direction of the wheel-side bearing 3 along the transverse control arm region 4) results, within a still linked three-point control arm, in a transverse control arm 4, which is aligned at least approximately in the transverse direction Q of the vehicle, and in a diagonal control arm, which is at least approximately sickle-shaped, in the transverse direction Q of the vehicle and in the longitudinal direction L of the vehicle, in the compression strut region 5.

Figure 5:
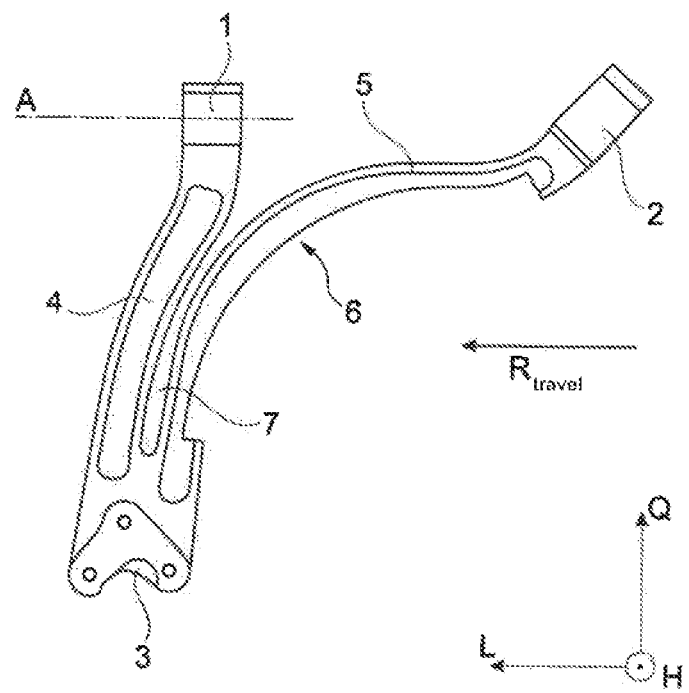

In FIG. 5, the same notch depth 7 as in FIG. 4 can be seen while, however, the cross-sectional tapering 6 extends over the entire length of the "diagonal control arm", formed by the notch 7 or the gap 7, of the compression strut region 5.

Figure 6:
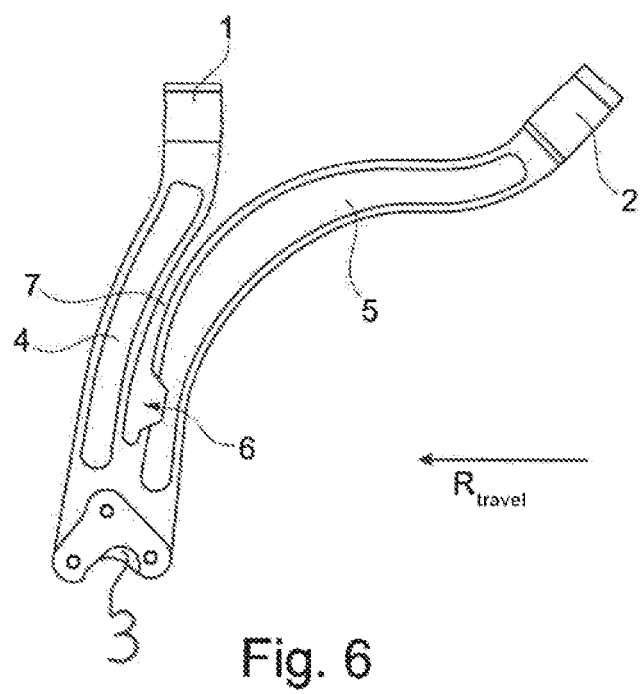

FIG. 6, as in FIGS. 4 and 5, shows a notch 7 or a gap 7 which divides the control arm into the transverse control arm and diagonal control arm mentioned. The cross-sectional tapering 6 is arranged here on the diagonal control arm in the direct vicinity of the wheel-side bearing 3.

LIST OF REFERENCE SIGNS

1 Front bearing
2 Rear bearing
3 Wheel-side bearing
4 Transverse control arm region
5 Compression strut region
6 Cross-sectional tapering
7 Notch or gap
$F_{rad}$ Radial forces
$F_{ax}$ Axial forces
$F_x$ Forces on wheel
$R_{travel}$ Direction of travel
A Bearing axis
L Longitudinal direction of the vehicle
H Vertical direction of the vehicle
Q Transverse direction of the vehicle

What is claimed is:

1. A wheel suspension for a motor vehicle, comprising:
    a three-point control arm arrangement configured to connect a wheel carrier to a vehicle body, wherein
    the three-point control arm arrangement comprises a transverse control arm region and a tension and/or compression strut region,
    the transverse control arm region is connected to the vehicle body via a first front bearing,
    an axis of rotation of the front bearing is aligned at least approximately in the direction of travel (Rtravel) of the vehicle,
    the tension and/or compression strut region are/is connected to the vehicle body via a rear bearing,
    an axis of rotation of the rear bearing is at least approximately perpendicular to a connecting line of the rear bearing to a wheel-carrier-side attachment, and
    at least one portion of the three-point control arm has a cross-sectional tapering running in the longitudinal direction (L) of the vehicle when the control arm is installed, wherein
        a cross section of the transverse control arm region and of the tension and/or compression strut region in the installed state is at least the same size, as viewed in the vertical direction (H) of the vehicle,
        a wall thickness of the portion with the cross-sectional tapering is at least half the size of a wall thickness of the remaining cross section of the three-point control arm,
        the cross-sectional tapering is arranged on a portion of the transverse control arm region,
        the cross-sectional tapering is arranged on a portion of the tension and/or compression strut region, and
        the cross-sectional tapering is spaced and separated from the first front bearing and is arranged in a portion on the transverse control arm region that, as viewed in the transverse direction (Q) of the vehicle, is closer to the vehicle body than to the wheel carrier.

2. The wheel suspension according to claim 1, wherein the cross-sectional tapering is arranged in a portion on the tension and/or compression strut region that, as viewed in the transverse direction (Q) of the vehicle, is closer to the wheel carrier than to the vehicle body.

3. The wheel suspension according to claim 2, wherein the cross-sectional tapering extends over the entire tension and/or compression strut region.

4. The wheel suspension according to claim 3, wherein the cross-sectional tapering extends over the entire transverse control arm region.

5. The wheel suspension according to claim 4, wherein the tension and/or compression strut region and the transverse control arm region are at least partially detached from one another by a notch and/or a gap.

6. The wheel suspension according to claim 5, wherein the notch and/or the gap between the tension and/or compression strut region and the transverse control arm region extend/extends, as viewed in the transverse direction (Q) of the vehicle, from the vehicle body up to half the length of the transverse control arm region in the direction of the wheel carrier.

7. The wheel suspension according to claim 6, wherein the three-point control arm is formed from an aluminum material.

8. A wheel suspension for a motor vehicle, comprising:
a three-point control arm arrangement configured to connect a wheel carrier to a vehicle body, wherein
the three-point control arm arrangement comprises a transverse control arm region and a tension and/or compression strut region,
the transverse control arm region is connected to the vehicle body via a first front bearing,
an axis of rotation of the front bearing is aligned at least approximately in the direction of travel (Rtravel) of the vehicle,
the tension and/or compression strut region are/is connected to the vehicle body via a rear bearing,
an axis of rotation of the rear bearing is at least approximately perpendicular to a connecting line of the rear bearing to a wheel-carrier-side attachment, and
at least one portion of the three-point control arm has a cross-sectional tapering running in the longitudinal direction (L) of the vehicle when the control arm is installed, wherein
a cross section of the transverse control arm region and of the tension and/or compression strut region in the installed state is at least the same size, as viewed in the vertical direction (H) of the vehicle,
a wall thickness of the portion with the cross-sectional tapering is at least half the size of a wall thickness of the remaining cross section of the three-point control arm,
the cross-sectional tapering is arranged on a portion of the transverse control arm region,
the cross-sectional tapering is arranged on a portion of the tension and/or compression strut region,
the cross-sectional tapering is arranged in a portion on the transverse control arm region that, as viewed in the transverse direction (Q) of the vehicle, is closer to the vehicle body than to the wheel carrier, and
the cross-sectional tapering is arranged in a portion on the tension and/or compression strut region that, as viewed in the transverse direction (Q) of the vehicle, is closer to the wheel carrier than to the vehicle body.

9. The wheel suspension according to claim 8, wherein the cross-sectional tapering extends over the entire tension and/or compression strut region.

10. The wheel suspension according to claim 9, wherein the cross-sectional tapering extends over the entire transverse control arm region.

11. The wheel suspension according to claim 10, wherein the tension and/or compression strut region and the transverse control arm region are at least partially detached from one another by a notch and/or a gap.

12. The wheel suspension according to claim 11, wherein the notch and/or the gap between the tension and/or compression strut region and the transverse control arm region extend/extends, as viewed in the transverse direction (Q) of the vehicle, from the vehicle body up to half the length of the transverse control arm region in the direction of the wheel carrier.

13. The wheel suspension according to claim 12, wherein the three-point control arm is formed from an aluminum material.

* * * * *